United States Patent
Dewan

(10) Patent No.: US 7,798,412 B2
(45) Date of Patent: Sep. 21, 2010

(54) INTERCHANGEABLE FOB CASING FOR RF CORE

(75) Inventor: Sunil Dewan, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 432 days.

(21) Appl. No.: 11/671,766

(22) Filed: Feb. 6, 2007

(65) Prior Publication Data
US 2007/0267503 A1 Nov. 22, 2007

Related U.S. Application Data

(63) Continuation-in-part of application No. 11/005,864, filed on Dec. 6, 2004.

(51) Int. Cl.
*G06K 7/00* (2006.01)
(52) U.S. Cl. .................. 235/486; 235/492; 340/572.8; 340/572.9
(58) Field of Classification Search ............... 235/492; 340/572.1–573.1
See application file for complete search history.

(56) References Cited

U.S. PATENT DOCUMENTS

| | | | |
|---|---|---|---|
| 4,855,583 A | 8/1989 | Fraser et al. | |
| 5,074,593 A | 12/1991 | Grosso | |
| 5,339,294 A * | 8/1994 | Rodgers | 368/67 |
| 5,362,955 A | 11/1994 | Haghiri-Tehrani | |
| 5,918,909 A | 7/1999 | Fiala et al. | |
| 5,921,584 A | 7/1999 | Goade, Sr. | |
| 5,936,227 A | 8/1999 | Trüggelmann et al. | |
| 5,986,562 A * | 11/1999 | Nikolich | 340/693.5 |
| 6,224,108 B1 | 5/2001 | Klure | |
| 6,248,199 B1 | 6/2001 | Smulson | |
| 6,299,530 B1 | 10/2001 | Hansted et al. | |
| 6,315,206 B1 | 11/2001 | Hansen et al. | |
| 6,353,420 B1 | 3/2002 | Chung | |
| 6,471,127 B2 | 10/2002 | Pentz et al. | |
| 6,484,947 B1 * | 11/2002 | Miyata | 235/492 |
| 6,561,432 B1 | 5/2003 | Vedder et al. | |
| 6,588,658 B1 | 7/2003 | Blank | |
| 6,644,555 B1 | 11/2003 | Berney | |
| 6,651,892 B2 * | 11/2003 | Hooglander | 235/492 |
| 6,685,097 B1 | 2/2004 | Housse | |

(Continued)

FOREIGN PATENT DOCUMENTS

EP 1295733 A1 3/2003

OTHER PUBLICATIONS

"TI Embraces Prox Card Standard: Texas Instrument's ISO 14443 payment platform promises faster data transfer rates and more security." RFID Journal Mar. 6, 2003, http://rfidjournal.com/article/articleprint/327/-1/1.

(Continued)

*Primary Examiner*—Thien Minh Le
*Assistant Examiner*—Christle I Marshall
(74) *Attorney, Agent, or Firm*—Townsend and Townsend and Crew

(57) ABSTRACT

An apparatus for contactless transactions is disclosed. In one embodiment, a transaction fob assembly includes a standardized fob core and an outer shell adapted to secure the core within the outer shell. Various embodiments provide for the fob core to include circuitry, an antenna, a battery, a switch and a LED.

25 Claims, 10 Drawing Sheets

U.S. PATENT DOCUMENTS

| | | |
|---|---|---|
| 6,702,185 B1 | 3/2004 | Zercher |
| 6,727,802 B2 | 4/2004 | Kelly et al. |
| 7,078,604 B2 | 7/2006 | Rapaport |
| 7,083,086 B2 | 8/2006 | Whitaker |
| 7,124,955 B2 | 10/2006 | Lasch et al. |
| 7,525,424 B2 * | 4/2009 | Morse et al. ............. 340/539.1 |
| 2001/0022446 A1 | 9/2001 | Klure |
| 2003/0117900 A1* | 6/2003 | Fujisawa et al. .............. 368/47 |
| 2003/0150919 A1 | 8/2003 | Blank |
| 2003/0159560 A1 | 8/2003 | Drescher |
| 2004/0099201 A1* | 5/2004 | Chen ........................ 116/28 R |
| 2004/0129785 A1 | 7/2004 | Luu |
| 2005/0033619 A1* | 2/2005 | Barnes et al. ................... 705/7 |
| 2005/0038741 A1 | 2/2005 | Bonalle et al. |
| 2005/0137986 A1 | 6/2005 | Kean |
| 2005/0258245 A1* | 11/2005 | Bates et al. .................. 235/451 |
| 2006/0118639 A1 | 6/2006 | Kean et al. |
| 2007/0033974 A1* | 2/2007 | Calavenna ................ 70/456 R |
| 2007/0212258 A1* | 9/2007 | Neel et al. .................... 422/58 |
| 2008/0106388 A1* | 5/2008 | Knight .................... 340/10.42 |

OTHER PUBLICATIONS

EPO Search Report mailed Sep. 22, 2008 in related case EP 05826147.0.

* cited by examiner

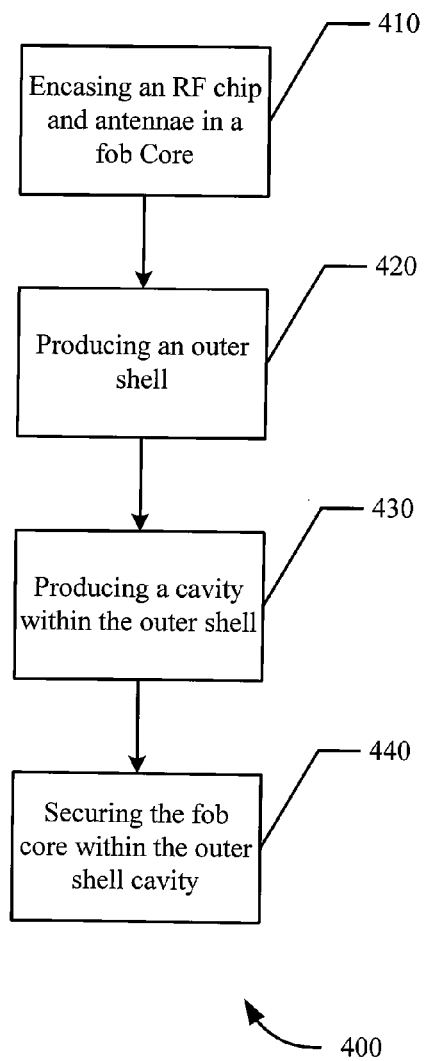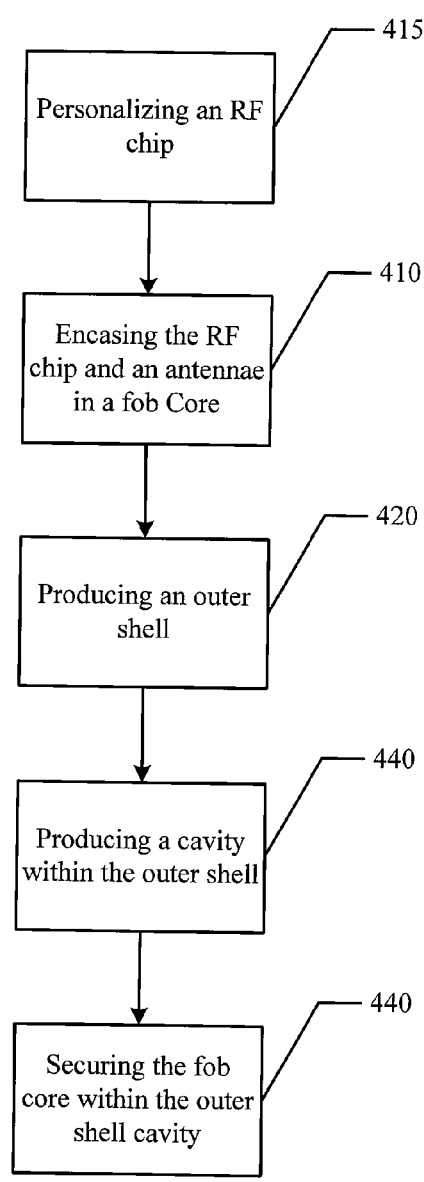
FIG. 4A
FIG. 4B

INTERCHANGEABLE FOB CASING FOR RF CORE

CROSS-REFERENCES TO RELATED APPLICATIONS

This application is a continuation-in-part, and claims the benefit, of U.S. patent application Ser. No. 11/005,864, filed Dec. 6, 2004, entitled "PUNCHOUT CONTACTLESS TRANSACTION CARDS," which application is entirely incorporated herein by reference for all purposes.

BACKGROUND OF THE INVENTION

This invention relates generally to a transaction fob assembly and, but not by way of limitation, to transaction fob assemblies for contactless transactions amongst other things. Embodiments of the invention further relate to a fob core that may be implemented in a wide variety of marketable outer shells that secure a standardized fob core within the outer shell. Embodiments of the invention also relate to outer shells incorporating a switch.

Transaction cards, such as credit cards, debit cards, ATM cards, bank cards, etc., are increasingly replacing other types of tender in consumer transactions. In addition, vendors and merchants are issuing ever more types of transaction cards, such as loyalty cards, gift cards, stored valued cards, etc., for sales promotions and the cultivation of customer loyalty. Recently there has been a movement toward contactless credit cards that initiate and complete a transaction with a quick wave of a card before a radio frequency enabled terminal reader. Many major credit card companies now offer contactless cards and many merchants have installed radio frequency enabled readers.

While consumers juggle increasing numbers of transaction cards, they still generally rely on a small subset of cards for most of their purchases. Consumers also rely on cards to gain access to buildings or to provide other authentication schemes. For example, a consumer may use a favorite credit card for most purchases, and rarely use other credit cards, debit cards, stored value cards, etc. For this subset of frequently used cards, consumers desire fast and easy card accessibility relative to the rest of the cards they carry. Consumers may desire a more creative transaction device other than a traditional plastic card. Marketers and merchants may also desire to promote new cards with merchandise or other paraphernalia.

BRIEF SUMMARY OF THE INVENTION

In one embodiment, the present disclosure provides a transaction fob assembly including a fob core comprising an integrated circuit that communicates data with a radio frequency-enabled communication device reader; and an outer shell adapted to secure the core within the outer shell. The outer shell may include a cavity, or a mechanism adapted to release the fob core from within the outer shell. The outer shell may be a toy, a collectors item, an article of clothing, a ball, sports memorabilia, personal data assistant, digital music player, a mobile phone, or a figurine. The outer shell may be constructed of molded plastic, nonmetallic material, or fabric. The outer shell may also include a toy, a collectors item, an article of clothing, a ball, sports memorabilia, personal data assistant, digital music player, a mobile phone, or a figurine. The fob may include threads that screw into the outer shell. The fob core may be secured within the outer shell by opening the outer shell using a hinge, placing the fob core between the two portions of the outer shell and closing the outer shell. The outer shell may include a first portion and a second portion, such that the first portion and second portion snap together and the core is placed in the cavity while the first portion and the second portion are not snapped together.

The fob core may be one of a plurality of standardized mass-produced fob cores. The fob core may also include an antenna for transmitting and receiving data, a switch, for example, a biometric activated switch, a heat sensitive switch, or a mechanical switch. The fob core may also include a battery or an LED that illuminates when the switch is "ON". The fob core may also include a casing enclosing the integrated circuit.

A transaction fob assembly may include a key chain attached to the fob core. Data is transmitted to the fob core using radio frequency electronics. The transaction fob assembly may communicate information selected such as a credit card number, a debit card number, a gift card number, an account number, or a stored value number. The transaction fob assembly may include data that meets standards defined by ISO 14443, ISO 18092, or ISO 15693, among others. The transaction data may authenticate a user, for example, access to a building, authentication for access to an event, authentication for ticketing, authentication for a coupon, authentication for a loyalty award program or similar applications.

In another embodiment, the present disclosure provides a method of making a transaction fob assembly including encasing an integrated circuit within a fob core, wherein the integrated circuit wirelessly communicates data with a radio frequency-enabled communication device; producing an outer shell with a cavity for the fob core; and securing the fob core within the cavity of the outer shell. The above steps in the method may occur at separate locations. The method may further include screwing the fob core into the cavity in the outer shell, unsnapping the outer shell, and/or unhinging the outer shell.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

FIG. 4A shows a flowchart showing a method of making a transaction fob assembly according to one embodiment of the invention.

FIG. 4B shows a flowchart showing a method of making a transaction fob assembly including a personalization step according to one embodiment of the invention.

In the appended figures, similar components and/or features may have the same reference label. Where the reference label is used in the specification, the description is applicable to any one of the similar components having the same reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

The embodiments of the invention include a transaction fob assembly that may include a fob core housed within an outer shell. The fob core includes contactless transaction circuitry and an "active" or "passive" antenna that communicate with a terminal reader. The terminal reader may be a radio frequency-enabled reader or other radio frequency communication device. The outer shell may include any three-dimensional shape. The outer shell may be a toy, sports memorabilia, stuffed animal, an article of clothing, a figurine, a trinket, a collector's item, or the like. The outer shell may include a battery and/or a switch. The outer shell may be formed from molded plastics, metal and/or other nonmetallic material. The outer shell may be a promotional gift or the like and may include a cavity into which a fob core may be secured. The fob core may be removed and placed into another outer shell. Likewise, a fob core may be replaced with a second fob core by the user or a merchant.

Figure 1A:
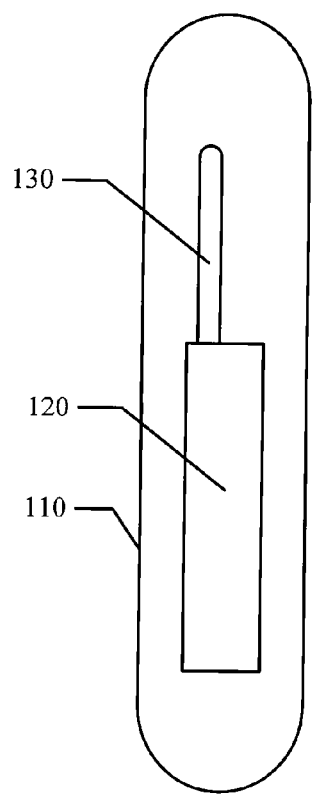
FIG. 1A shows a fob core according to one embodiment of the invention.

FIG. 1A shows a fob core 100 according to one embodiment of the present invention. The fob core 100 may include an integrated circuit 120, a passive antenna 130 and an outer casing 110. The integrated circuit 120 and antenna 130 may include circuitry that communicates transaction details to a terminal via a contactless reader or another radio frequency-enabled communication device as tender for a transaction. The integrated circuit 120 may store transaction information for a credit card, debit card, cash card, stored value card, gift card, checking account, or bank account. The integrated circuit 120 may also communicate authentication information, building access, event access, loyalty information, ticketing information, couponing information, etc. The fob core may also be programmable such that card information may be changed by the user, for example, through a computer radio frequency interface, a merchant at a point of sale terminal, and/or another radio frequency communication device. The fob core includes a receiver for receiving information from a radio frequency-enabled reader, another radio frequency-enabled communication device and/or a device for providing card information. Account information may also be received by the receiver. Radio frequency-enabled devices, including radio frequency readers, provide power to the integrated circuitry. The integrated circuit 120 may be designed to conform to ISO/IEC standards for contactless integrated circuit cards and proximity cards, including the ISO/IEC 14443 standard and/or the ISO/IEC 15693 standard, among others.

The integrated circuit 120 communicates with the antenna 130. The antenna 130 may then communicate transaction information, for example, Magnetic Strip Track I and II data, to a radio frequency-enabled reader or another radio frequency-enabled communications device. The antenna 130 may use any wireless communication methodology and may communicate with radio frequencies. Furthermore, the information transmitted by the fob core 100 may conform to the specifications for credit cards, PayPass®, Discover Zip®, Visa Contactless®, ExpressPay®, and the like. In other embodiments, the fob core 100 may also include security information such as a PIN, a biometric, a password, digital photograph, encryption, token key data or other security data.

The integrated circuit 120 and antenna 130 may be housed within a outer casing 110. The outer casing 110 may be designed with standardized dimensions such that the fob core 100 may be mass produced and used in a variety of outer shells to create a transaction fob assembly. While the fob core 100 is shown as a cylinder, the fob core 100 is not limited to any physical dimension or shape. The fob core 100 may be box shaped, cylindrical, spherical, disc, cubic, or any other shape. The fob core 100 is designed to be standardized for integration into a wide variety of outer shells. The outer casing 110 of the fob core 100 may have rings, grooves, holes, divots, slots or the like for securing the fob core within an outer shell.

Figure 1B:
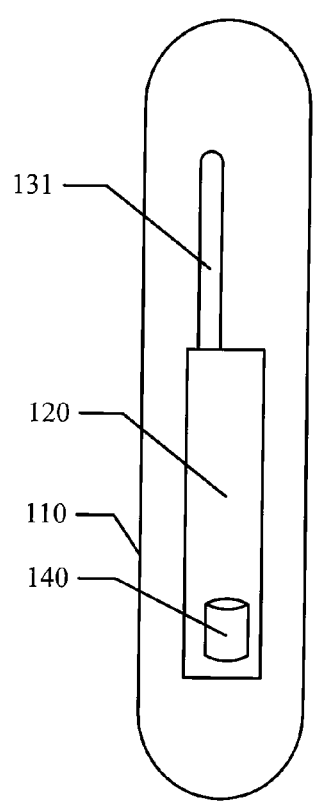
FIG. 1B shows a fob core with a battery according to one embodiment of the invention.

FIG. 1B shows a fob core 100 according to another embodiment of the invention. In this embodiment, the fob core 100 includes a battery 140. The battery provides power to the integrated circuit 120 and an active antenna 131. In the embodiment shown in FIG. 1A, the passive antenna 130 receives power from a radio frequency-enabled device. When the fob core 100 is not in contact with a radio frequency enabled device, the integrated circuit 120 and passive antenna 131 do not have power and turned "OFF". The battery included in the embodiment shown in FIG. 1B may provide constant power to the integrated circuit 120 and the active antenna 131. The battery may also be secured within the outer shell and electronically connected to the fob core. For example, the battery may include silver-oxide, lithium, mercury, manganese, magnesium, zinc-air, or alkaline materials. The battery, for example, may be a thin film, cylindrical, or disk shaped.

Figure 1C:
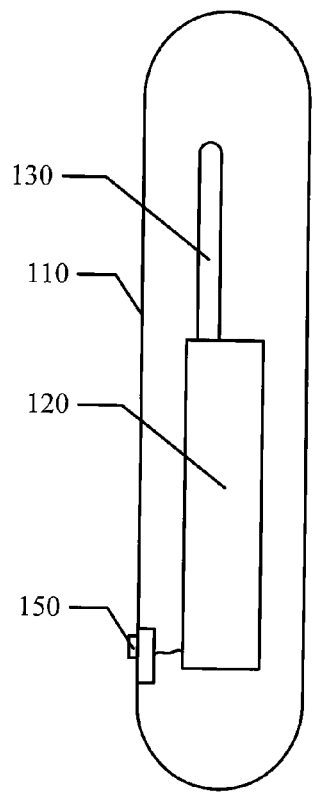
FIG. 1C shows a fob core with a mechanical switch according to one embodiment of the invention.

FIG. 1C shows a fob core 100 according to another embodiment of the invention. In this embodiment, the fob core 100 includes a mechanical switch 150. The mechanical switch is electronically connected to the integrated circuit 120. The switch 150 may prevent fraudulent activity by a sniffing the fob core without permission of the user. A radio frequency-enabled communication device with enough power or within close enough proximity to the fob core may read the account information from the fob core for fraudulent uses. To protect the account information from such fraudulent activity, the switch 150 prevents communication with a radio frequency-enabled communication device unless the switch 150 is switched to the "ON" position. If the switch is in the "OFF" position, the device is incapable of communicating account or other information. Other types of switches may be used, for example, a heat activated switch, biometric switch, a variety of mechanical switches, etc. The switch 150 may be placed on an outer shell and electronically connected with the fob core. Alternatively, the switch may be on an exposed portion of the outer casing 110 of the fob core 100.

Figure 1D:
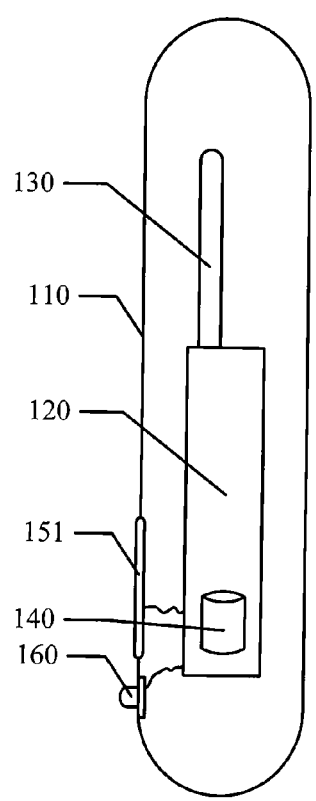
FIG. 1D shows a fob core with a heat sensitive switch and a LED according to one embodiment of the invention.

FIG. 1D shows a fob core 100 according to another embodiment of the invention. In this embodiment, the fob core 100 includes a battery 140, a heat activated switch 151 and an LED 160. The LED 160 may be illuminated when the device is activated allowing the user to know that the device is active. The battery 140 provides power to the LED 160. The heat activated switch 151 may be activated by direct application of body heat, for example, by a user placing a finger over the heat activated switch 151. Once the heat activate switch 151 reaches a predetermined temperature, the fob is turned "ON" and may communicate with a radio frequency-enabled communication device.

Figure 2A:
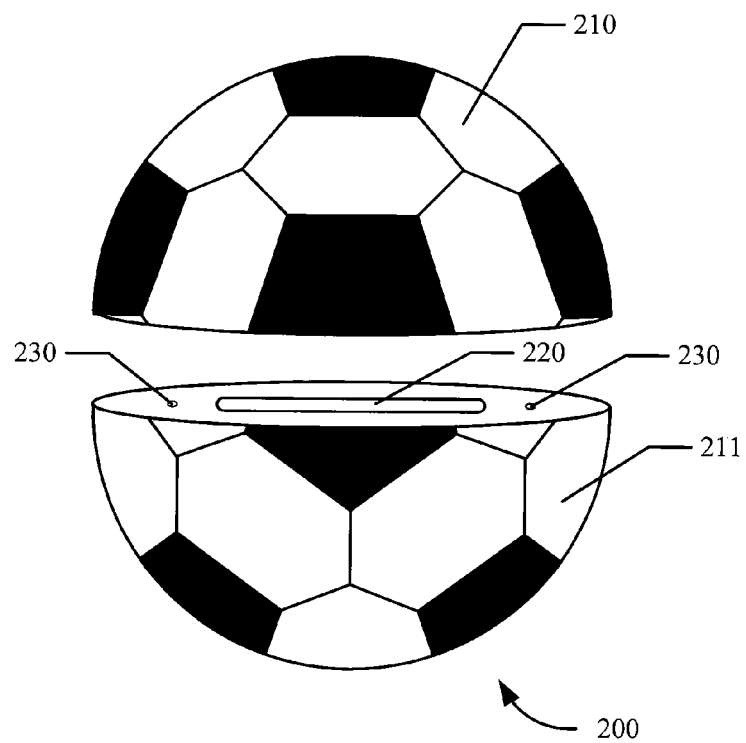
FIG. 2A shows an exemplary snapping outer shell according to one embodiment of the invention.
Figure 2B:
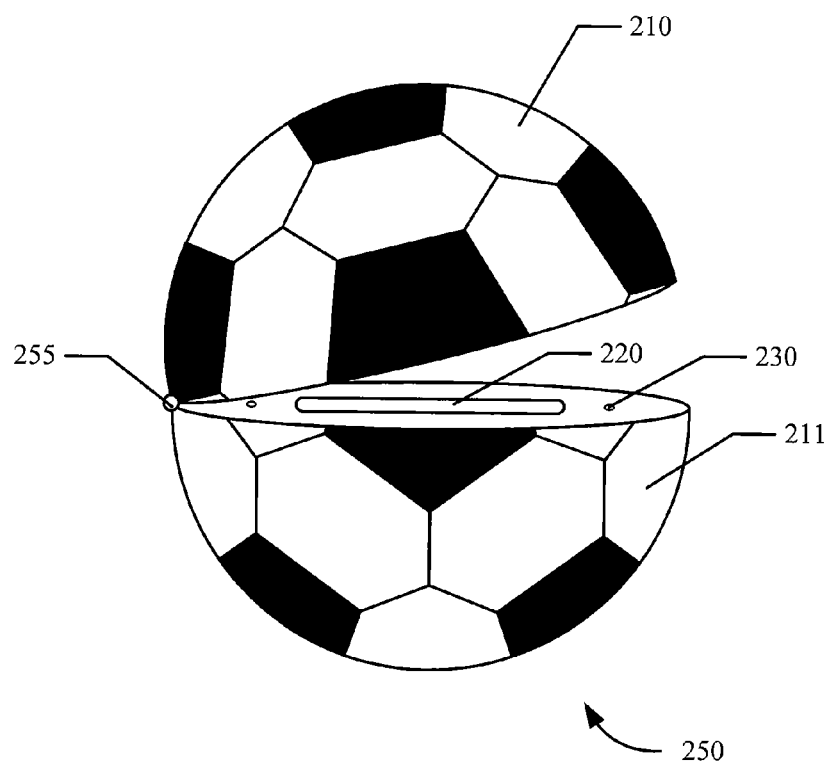
FIG. 2B shows an exemplary hinged outer shell according to one embodiment of the invention.
Figure 2C:
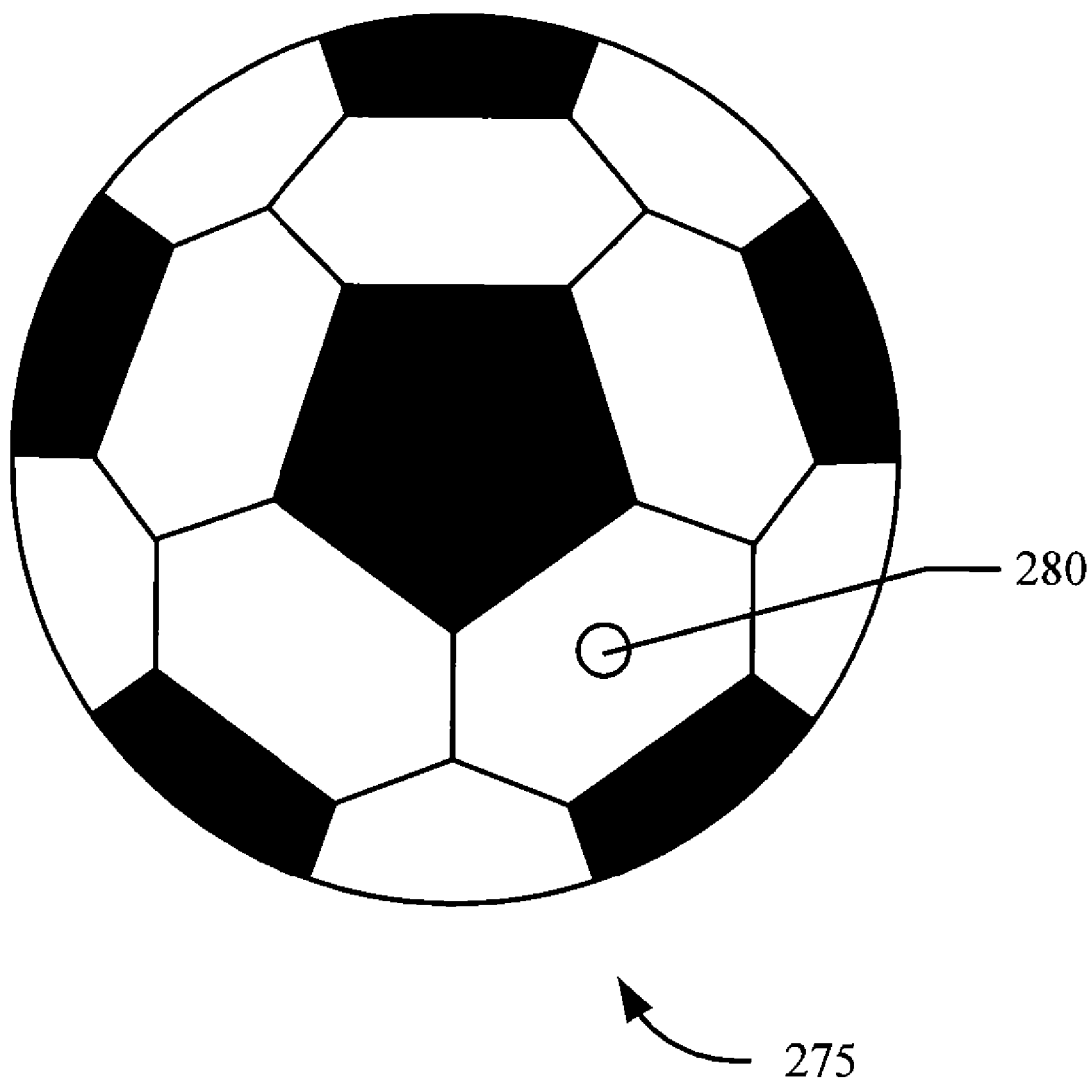
FIG. 2C shows an exemplary outer shell with a hole adapted to receive a transaction fob according to one embodiment of the invention.

FIGS. 2A, 2B and 2C show exemplary outer shells according to embodiments of the invention. A transaction fob assembly includes a fob core 100 and an outer shell. FIG. 2A shows a miniature soccer ball as an exemplary outer shell 210. The outer shell 200 in this embodiment includes a top portion 210 and a bottom portion 211. The outer shell 200 includes a cavity 220 within which a fob core 100 may be secured within the outer shell 200. Once the fob core is secured within the outer shell 200 the top portion 210 and the bottom portion 211 may be snapped together. Other mechanisms to secure the top portion 210 to the bottom portion 211 may be used. The outer shell 200, may include snap guides 230 to aid in aligning the top portion 210 and bottom portion 211 when snapped together. The outer shell 200 may be opened and closed as needed to remove the fob core 100. Those skilled in the art will recognize other mechanisms that may be used to snap the top portion 210 and bottom portion 211 together, including pins, locks, slides, tape, etc.

FIG. 2B shows a hinged outer shell 250 according to another embodiment of the invention. The hinged outer shell 250 includes a top portion 210 and bottom portion 211 that are connected with a hinge 255. The outer shell 250 may then be opened and closed as needed to access the fob core. The outer shell 250 includes a cavity 220 that secures a fob core 100. The outer shell may also include alignment holes 230 to aide in aligning the top portion 210 and bottom potion 211 when closed. Those skilled in the art will recognize other mechanisms that may be used to snap the top portion 210 and bottom portion 211 together, including pins, locks, slides, tape, etc.

FIG. 2C shows another exemplary outer shell 275 according to another embodiment of the present invention. In this embodiment, the outer shell 275 includes a cavity 280 in which the fob core 100 may be placed. The cavity 280 may be threaded wherein the fob core 100 may be screwed into the cavity 280. The cavity 280 may also include a snap that secures the fob core 100 within the outer shell 275. The snap may be pressed to release the fob core 100.

Figure 3A:
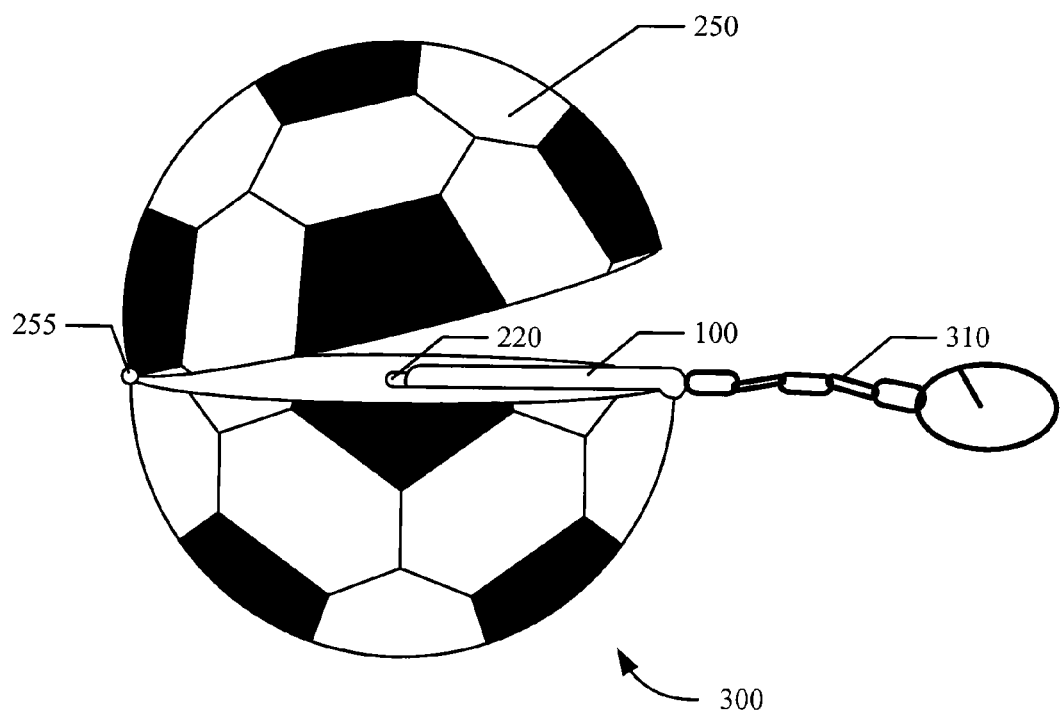
FIG. 3A shows a transaction fob assembly with a hinged outer shell, a fob core, and a key chain according to one embodiment of the invention.
Figure 3B:
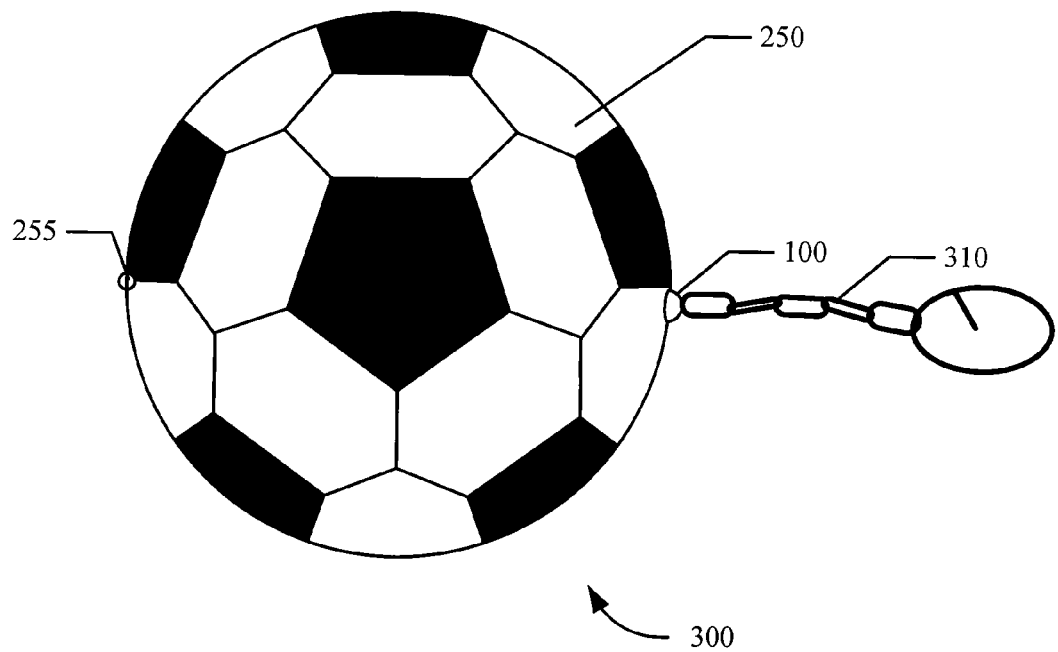
FIG. 3B shows the hinged transaction fob assembly of FIG. 3A with the hinge closed according to one embodiment of the invention.

FIG. 3A shows a transaction fob assembly 300 according to another embodiment of the invention that includes a hinged outer shell 250, cavity 220, fob core 100 and a key chain 310 connected to the fob core 100. Alternatively, the key chain 310 may be connected directly to the hinged outer shell 250. FIG. 3B shows the hinged outer shell 205 closed and the fob core 220 partially extending from within the outer shell 205 with the key chain 310. Alternatively, the fob core may be completely encased within the outer shell.

The transaction fob assembly of the present invention may also have additional elements for transaction processing. These may include indicia on the transaction card such as alphanumeric characters that uniquely identify a transaction account associated with the fob core. The transaction fob assembly may further include a bar code that has information readable by a bar code scanner. In addition, the transaction fob assembly may have a signature strip that can be signed by the user.

The transaction fob assembly may have advertising, branding, instructional information and other indicia. For example, the transaction fob assembly may contain promotional information, trademarks, logos, graphics, website addresses, etc., associated with the vendors, merchants and/or service providers that sponsor or accept the transaction fob assembly as tender. The indicia may be confined exclusively to the outer shell portion of the transaction fob assembly or on the fob core.

FIG. 4A shows a flowchart 400 showing a method of making a transaction fob assembly according to one embodiment of the invention. An RF integrated circuit and antenna is encased within a fob core at block 410. At block 420 a outer shell is formed and a cavity is created within the outer shell to secure the fob core at block 430. In other embodiments the cavity may be formed within the outer shell simultaneously with formation of the outer shell. The fob core is then placed within the outer shell creating a transaction fob assembly at block 440.

FIG. 4B shows a flowchart 460 showing a method of making a transaction fob assembly according to another embodiment of the invention. In this embodiment, an RF integrated circuit (or chip) is personalized in block 415. Account and/or device holder information is written to the integrated circuitry 120 within the fob core 100. Authentication information may also be written to the fob core 100. Information is transmitted to the fob core using a radio frequency-enabled communication device. The information is received by the passive antenna 130 or active antenna 131 and stored in the integrated circuit. The information is stored in non-volatile memory within the integrated circuit 120, for example, flash memory.

Figure 5A:
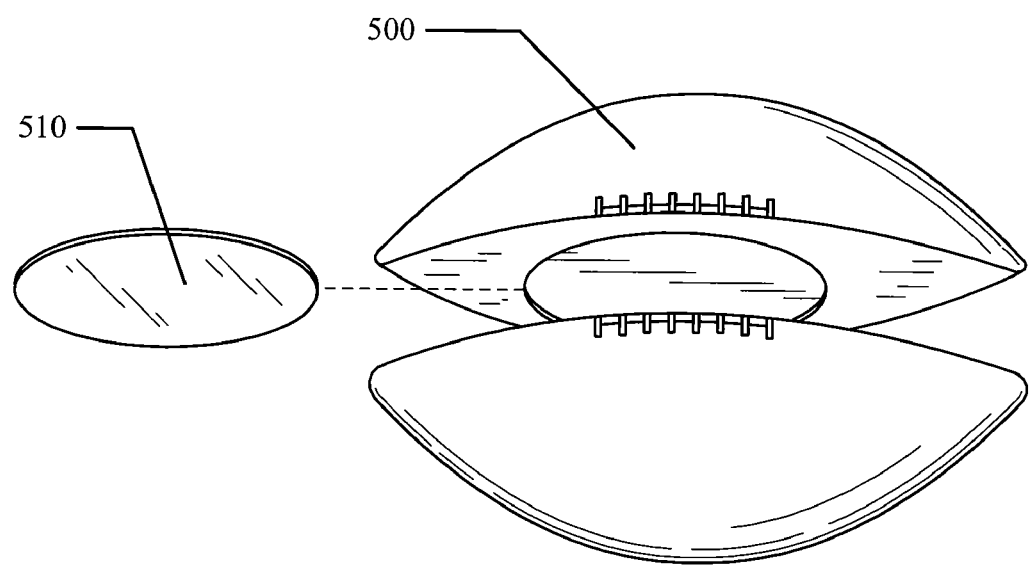
FIGS. 5A and 5B shows an outer shell in the shape of a football and with a disc shaped fob according to another embodiment of the invention.
Figure 5B:
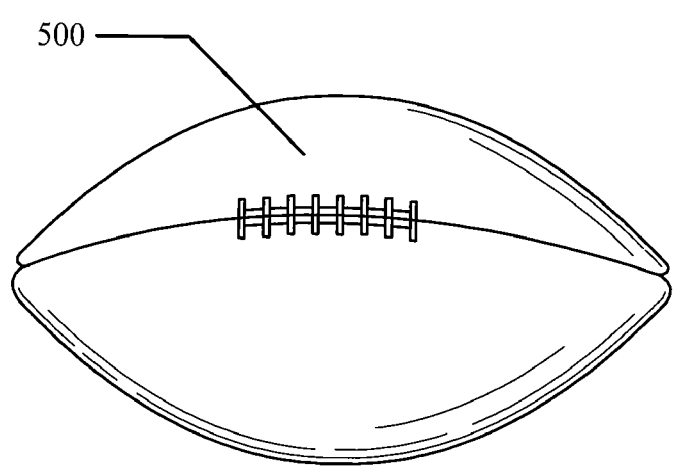

FIGS. 5A and 5B show another transaction fob assembly according to one embodiment of the invention. The outer shell 500, in this embodiment, is in the shape of a football. The football 500 may be miniature or full sized. The football 500 may be made of leather, plastic, rubber, nonmetallic material, and/or fabric. A disk shaped fob core 510 is secured within the football as shown in FIG. 5A. Accordingly, the football can be used as a transaction device.

Figure 6:
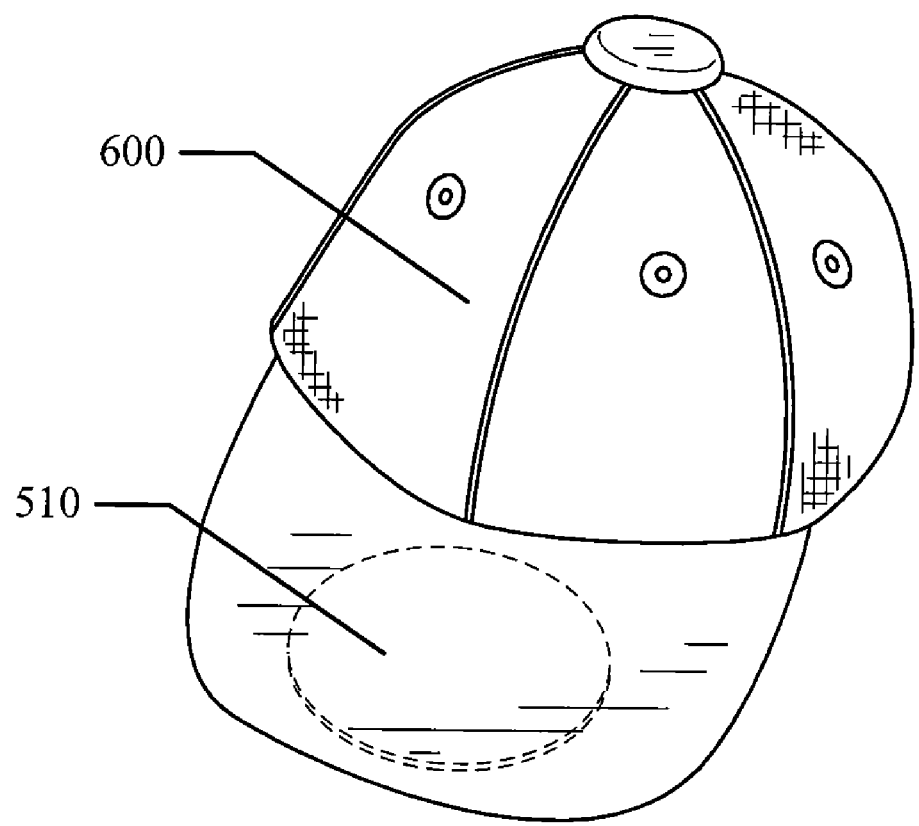
FIG. 6 shows an outer shell in the shape of a baseball hat and with a disc shaped fob according to another embodiment of the invention.

FIG. 6 shows another transaction fob assembly according to another embodiment of the invention. The outer shell is a baseball cap 600 with a disk shaped fob core 510 placed in the brim. Of course, the fob core 510 may be placed in the band, the cap, the top or any other portion of the cap 600. Moreover, any shape or type of hat may be used in embodiments of the invention. Fob cores of various shapes, thicknesses and sizes may also be used.

Figure 7:
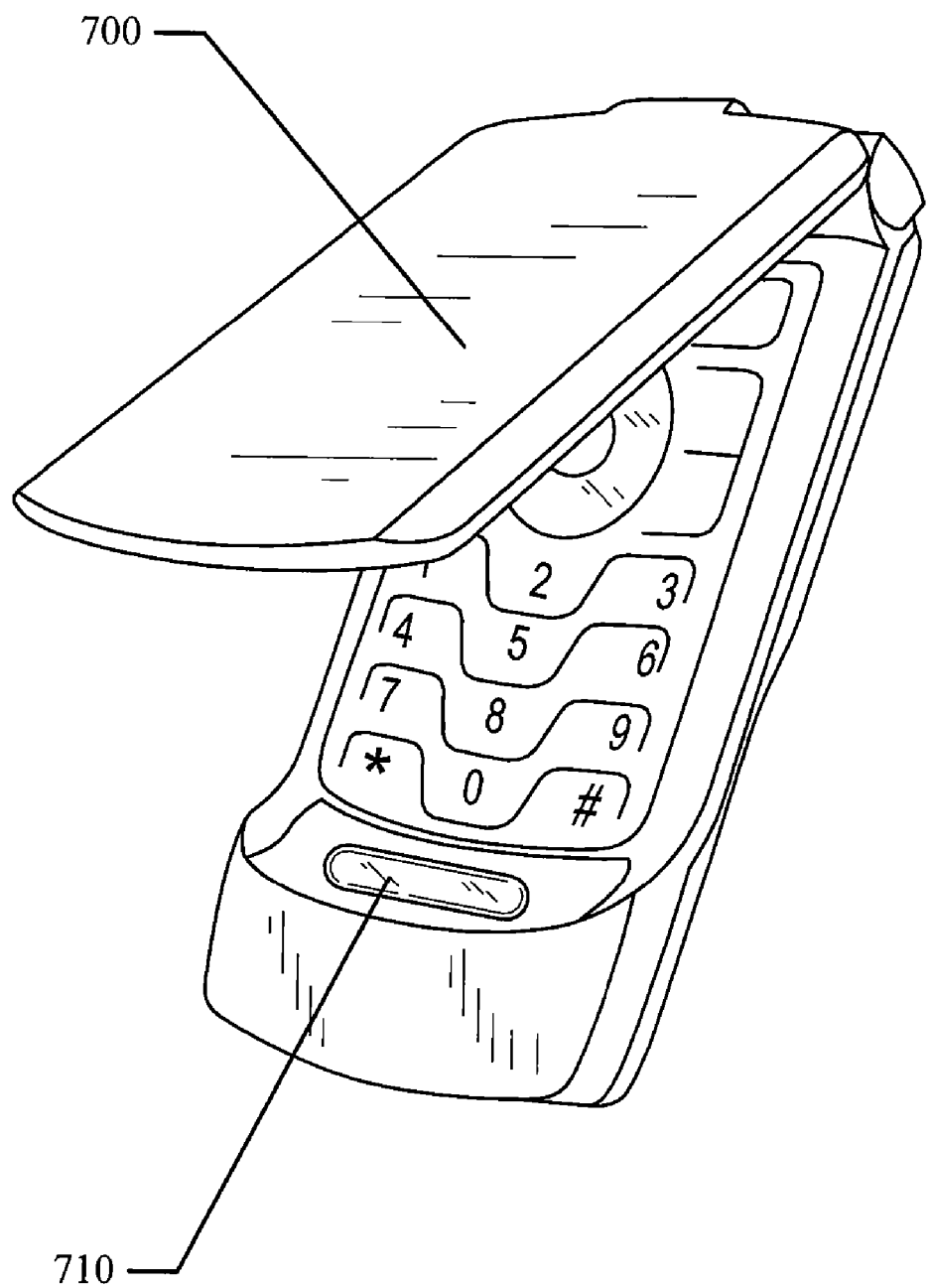
FIG. 7 shows a cell phone as an outer shell according to another embodiment of the invention.

FIG. 7 shows another transaction fob assembly according to another embodiment of the invention. A fob core 710 is secured within a mobile phone 700. The mobile phone 700 with the fob core 710 may be used as tender during a transaction with a merchant using a terminal reader. Other electronic devices may be used, for example, a mobile phone, a personal digital assistant, a digital music player and/or a personal gaming device may be used.

Figure 8:
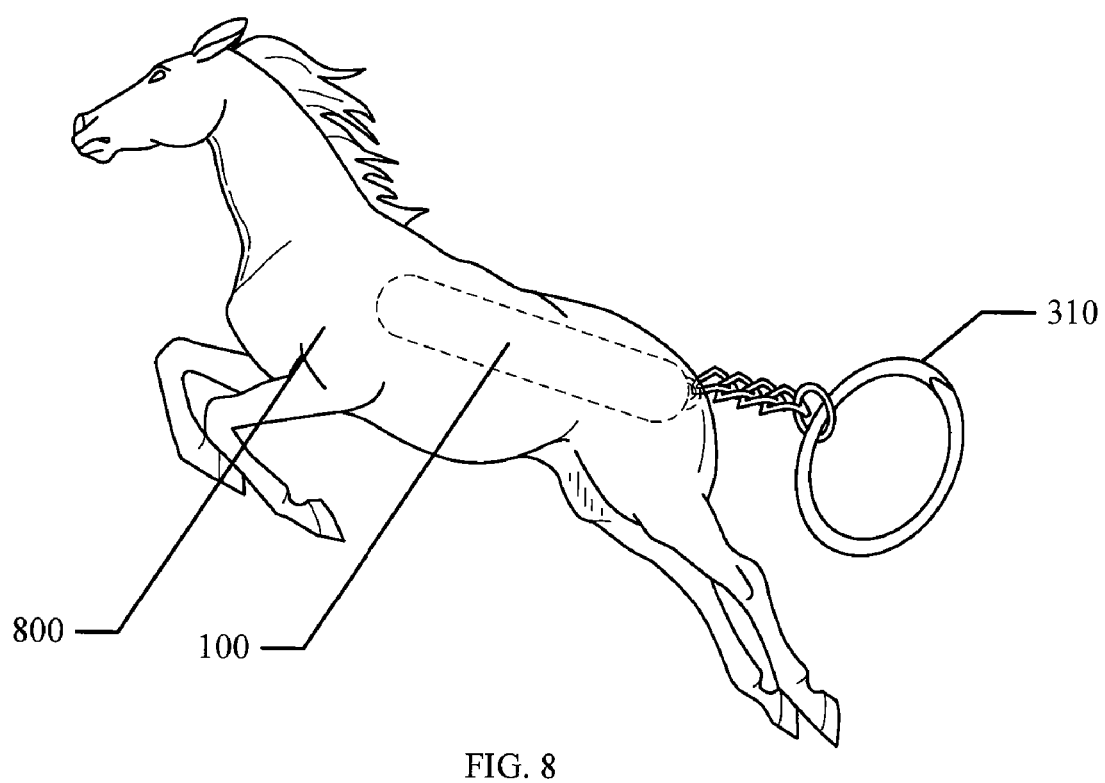
FIG. 8 shows an outer shell in the shape of a horse figurine with a cylindrical shaped fob according to another embodiment of the invention.

FIG. 8 shows yet another transaction fob assembly according to another embodiment of the invention. In this embodiment the fob core 100 is secured within a figurine 800 in the shape of a horse. The FIG. 800 includes a key chain 310. Any figurine made by any processes may be used.

Figure 9:
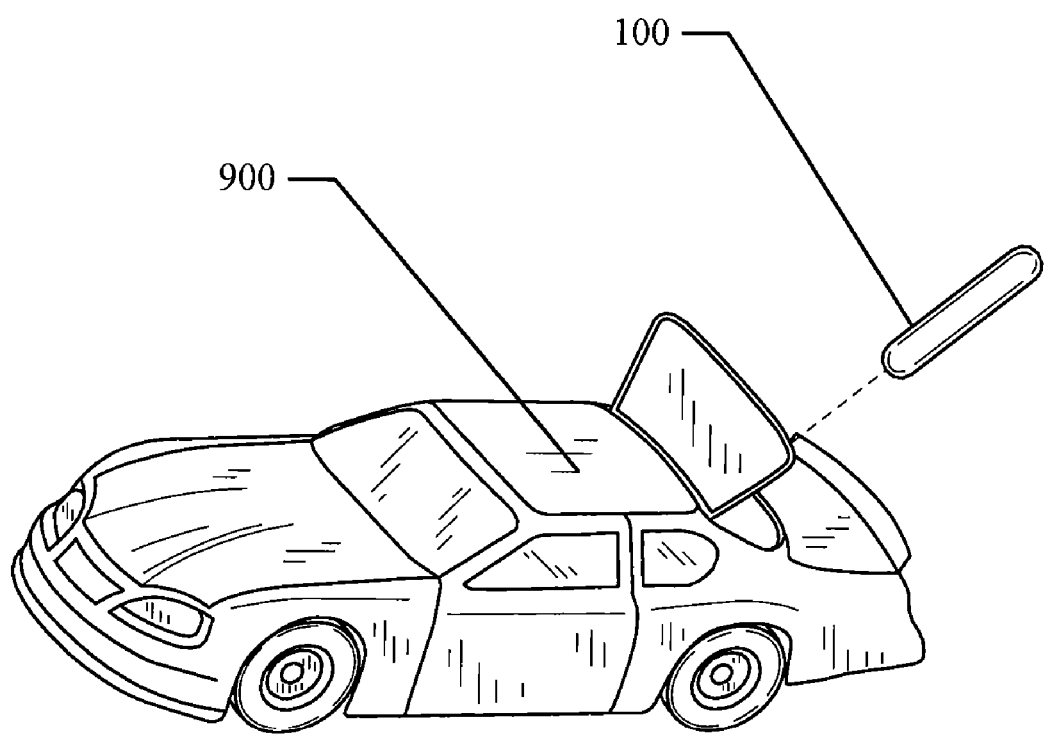
FIG. 9 shows an outer shell in the shape of a miniature race car and with a cylindrical shaped fob according to another embodiment of the invention.

FIG. 9 show another transaction fob assembly according to another embodiment of the invention. In this embodiment, the outer shell is a miniature race car 900 with a cavity for securing a fob core 100. The miniature race car 900 may be a NASCAR® or IndyCar®. The race car 900 may be a collector's item. A marketer may periodically produce new editions as outer shells to replace previously purchased outer shells. The user may simply remove the fob core from the old race car 900 and place it into a new race car 900 as desired by the user. Alternatively, the marketer may include a fob core within the new edition that is associated with a stored value account, gift card account or the like.

The outer shells shown in the figures are exemplary only. The outer shell may include anything that includes a cavity or mechanism for securing a fob core 100. The outer shell may, for example, include sports memorabilia, a marketing trinket, a toy, an article of clothing, a collector's item, a ball, or a figurine. The outer shells described are exemplary only. Those skilled in the art will recognize a variety of outer shells within the scope of the invention that may be used or created. For example, a cruise ship may provide fob assemblies with a cruise ship shaped outer shell as a gift card or for use in transactions aboard the ship. An amusement park or restaurant may provide fob assemblies with a character shaped outer shell. A fob assemblies may be made in the shape of a movie character to promote a new movie. A coffee shop may provide stored value within a fob assembly employing a coffee cup/mug shaped outer shell.

A transaction may be conducted by positioning the transaction fob assembly a proximate distance from a point of sale device capable of receiving a signal from the antenna. Embodiments also include having the point of sale device transmit a signal to the fob core, such as a handshake signal instructing the fob core to start transmitting data that can be used to process the transaction. Embodiments may also include the fob core generating a signal to communicate with another radio frequency-enabled communication device. The POS device may also transmit signals with information about the transaction or debit account associated with the fob core for storage on the fob core. For example, when the transaction fob core conforms to the ISO/IEC 14443 standard, a POS device may send and receive messages about the transaction via a modulated RF field that has a carrier frequency of about 13.56 MHz. Besides payment data, the fob core may also transmit data to allow uses like ticketing, loyalty, couponing, access, authentication, etc.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

As used herein and in the appended claims, the singular forms "a", "and", and "the" include plural references unless the context clearly dictates otherwise. Thus, for example, reference to "a process" includes a plurality of such processes and reference to "the electrode" includes reference to one or more electrodes and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, or groups.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language, and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other mediums capable of storing, containing or carrying instruction(s) and/or data.

While the principles of the disclosure have been described above in connection with specific apparatuses and methods, it is to be clearly understood that this description is made only by way of example and not as limitation on the scope of the disclosure.

What is claimed is:

1. A transaction fob assembly comprising:
   a fob core comprising an integrated circuit that communicates data with a radio frequency-enabled communication device reader, the fob core further comprising a first end and a second end;
   an outer shell adapted to secure the fob core within the outer shell, wherein the first end of the fob core is positioned within the outer shell and the second end of the fob core protrudes from the outer shell beyond the exterior surface of the outer shell;
   a keychain coupled directly with the second end of the fob core, wherein the keychain is not coupled with the outer shell, and
   a switch disposed within the outer shell and communicatively coupled with the fob core, wherein the fob core is configured to communicate data when the switch is "ON" and configured to not communicate data when the switch is "OFF".

2. The transaction fob assembly of claim 1, wherein the outer shell comprises a cavity.

3. The transaction fob assembly of claim 1, wherein the fob core is one of a plurality of standardized mass-produced fob cores.

4. The transaction fob assembly of claim 1, wherein the fob core comprises an antenna for transmitting and receiving data.

5. The transaction fob assembly of claim 1 wherein the switch is selected from the group consisting of a biometric activated switch, a heat sensitive switch, and a mechanical switch.

6. The transaction fob assembly of claim 5 further comprising a LED, wherein the LED is illuminated when the switch is "ON".

7. The transaction fob assembly of claim 1 further comprising a battery.

8. The transaction fob assembly of claim 1, wherein the outer shell comprises a mechanism adapted to release the fob core from within the outer shell.

9. The transaction fob assembly of claim 4, wherein the data is transmitted using radio frequency electronics.

10. The transaction fob assembly of claim 1, wherein the fob core communicates information selected from the group consisting of a credit card number, a debit card number, a gift card number, an account number, and a stored value number.

11. The transaction fob assembly of claim 1, wherein the outer shell comprises a three dimensional shape.

12. The transaction fob assembly of claim 1, wherein the transaction data meets standards defined by a standard selected from the group consisting of ISO 14443, ISO 18092, and ISO 15693.

13. The transaction fob assembly of claim 1, wherein the transaction data authenticates a user.

14. The transaction fob assembly of claim 13, wherein the authentication is selected from the group consisting of authentication for access to a building, authentication for access to an event, authentication for ticketing, authentication for a coupon, and authentication for a loyalty award program.

15. The transaction fob assembly of claim 1, wherein the fob core further comprises a casing enclosing the integrated circuit.

16. The transaction fob assembly of claim 1, wherein the outer shell is selected from the group consisting of: a toy, a collectors item, an article of clothing, a ball, sports memorabilia, personal data assistant, digital music player, a mobile phone, and a figurine.

17. The transaction fob assembly of claim 1, wherein the outer shell is constructed of a material selected from the group consisting of molded plastic, nonmetallic material, and fabric.

18. The transaction fob assembly of claim 1, wherein the fob core comprises threads that screw into the outer shell.

19. The transaction fob assembly of claim 1, wherein the outer shell comprises a hinge between at least two portions of the outer shell, wherein the fob core is secured within the outer shell by opening the outer shell using the hinge, placing the fob core between the two portions of the outer shell and closing the outer shell.

20. The transaction fob assembly of claim 1, wherein the outer shell comprises a first portion and a second portion, wherein the first portion and second portion snap together and the core placed in the cavity while the first portion and the second portion are not snapped together.

21. A method of making a transaction fob assembly comprising:
   encasing an integrated circuit within a fob core, the fob core comprising a first end and a second end, wherein the integrated circuit wirelessly communicates data with a radio frequency-enabled communication device;
   producing an outer shell with a cavity for the fob core, wherein the outer shell includes a switch configured to electrically couple with the fob core when secured, and configured to allow the integrated circuit to communicate data with the radio frequency-enabled communication device;
   coupling a keychain directly with the first end of the fob core; and securing the fob core within the cavity of the outer shell such that the second end is positioned within the outer shell and the first end protrudes from within the outer shell beyond the exterior surface of the outer shell, wherein the keychain is not coupled with the outer shell.

22. The method of claim 21, wherein the encasing, producing and placing occur at separate locations.

23. The method of claim 21, wherein the encasing comprises screwing the fob core into the cavity in the outer shell.

24. The method of claim 21 further comprising unsnapping the outer shell.

25. The method of claim 21 further comprising unhinging the outer shell.

\* \* \* \* \*